UNITED STATES PATENT OFFICE

2,319,794
ABRASIVE

Loring Coes, Jr., Brookfield, Mass., assignor to Norton Company, Worcester, Mass., a corporation of Massachusetts No Drawing. Application July 23, 1942, Serial No. 452,094

11 Claims. (Cl. 51—298)

The invention relates to grinding wheels and other solid abrasive compositions. With regard to its more specific features, the invention relates to grinding wheels or other solid abrasive articles bonded with organic bond, especially the polymerized condensation product of a primary aromatic amine with an aldehyde.

One object of the invention is to provide a superior plasticizer for abrasive grains for the manufacture of the foregoing type of abrasive composition. Another object of the invention is to provide an improved dry snagging wheel. Another object of the invention is to provide a grinding wheel or other solid abrasive article which, in various embodiments, may be substituted for abrasive articles bonded with shellac, rubber or phenol-formaldehyde, and which will remove a greater amount of metal for a given wheel wear.

Another object of the invention is to provide an ingredient for assisting the conversion of an aromatic amine-aldehyde resin, particularly aniline-formaldehyde, to the infusible condition. Another object of the invention is to provide a mixing plasticizer for abrasive grains having properties superior to furfural for the manufacture of the type of abrasive articles indicated. Another object of the invention is to provide a mixing plasticizer which does not react to form water.

Another object of the invention is to provide a wetting agent for carrying out the dry granular mix method in the manufacture of the type of abrasive articles indicated of superior quality. Another object is to avoid or prevent swelling of the abrasive article; to permit cold pressing and curing without pressure, and to avoid the formation of any water during the cure. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of a primary aromatic amine, such as aniline, ortho, meta or para toluidine, or diamino diphenyl methane; and a quantity of formaldehyde. I may optionally provide a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

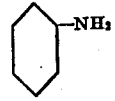

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —CH₂— groups to form a tough, heat resistant, semi-thermoplastic resin. I may add some of the formaldehyde after the initial condensation, in the form of a paraformaldehyde, or by the addition of hexa-methylene-tetramine.

As examples of the halogenated organic compound, I may use any of polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorohydrins; ethylene chlorhydrin, ethylene bromhydrin, or glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer. However, so far as the broad features of this invention are concerned, and apart from the esters hereinafter described, the halogenated organic compound may be omitted altogether.

Since the invention relates to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass, garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine aldehyde polymers have not been used commercially for the manufacture of grinding wheels and other solid abrasive products so far as I am aware.) The furfural cross links the polymer and, therefore, converts it to the "infusible" condition. A stoichiometric quantity of aniline and formaldehyde condensed in the presence of a strong acid is believed to produce a resin which is structurally represented thus:

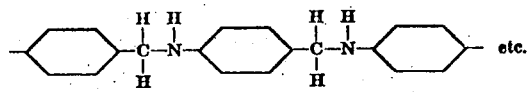

Such a resin cross-linked with furfural is believed to be represented thus:

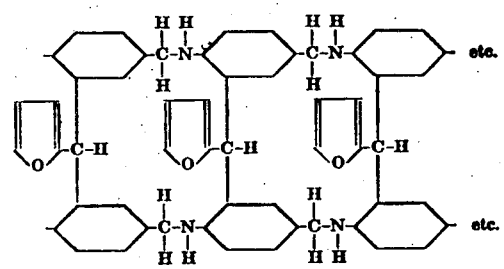

My invention consists in the use of the tri-monochloracetates of certain trihydric alcohols, more particularly in the use of glycerol tri-monochloracetate or tri-methylol propane tri-monochloracetate, or mixtures thereof, as the wettant-plasticizer for grinding wheels and other solid abrasive articles made out of abrasive grains bonded with aromatic-amine-aldehyde resin with or without the use of other halogenated compounds, with or without other fillers, and with or without the use of other wettant-plasticizers. For example, a mixture of glycerol tri-monochloracetate and furfural may be used to wet the abrasive grains, but at present I prefer to use glycerol tri-monochloracetate alone. This ester is:

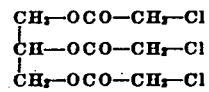

I believe it cross-links the aniline-formaldehyde polymer thus:

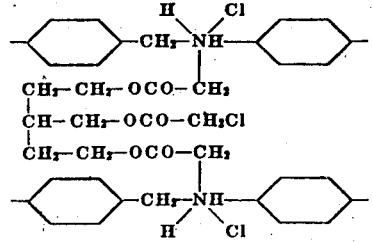

Tri-methylol propane tri-monochloracetate is written thus:

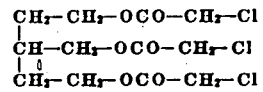

It will thus be seen that it is definitely related to glycol tri-monochloracetate, and this relationship appears also from the manner in which it cross-links with the aniline formaldehyde polymer, as follows:

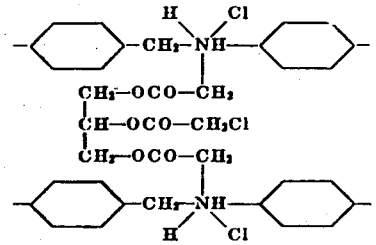

Thus, I may use either of the two esters or a mixture of both.

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

Wheels or other abrasive articles made according to the invention thus have certain structural and functional advantages and, according to my invention, methods of making them achieve still further advantages in that, for example, it is possible to avoid, when desired, having to simultaneously mold or press and heat-treat them, as in a hot press, and hence I do not have to tie up expensive hot-press equipment.

My invention, however, consists also in the discovery of these esters as plasticizers or solvents or hardening agents for amine formaldehyde resin, for thereby I am enabled, with or without fillers, to produce a strong, tough and durable resin which, in its intermediate stage, can be readily and inexpensively molded or otherwise given desired configuration or shape according to the article to be made up, and inexpensively cured, as is well illustrated in the examples later herein given in the making up of an abrasive article; but it is to be understood that, where employed in the making of an abrasive article, I am enabled to achieve distinct advantages and improve intermediate and final results. For example, the ester is a good wetting agent for the abrasive grain, and this makes for achieving uniform coverage of each grain by the particles of the powdered resin, the wetting agent, in wetting the surfaces of the grains uniformly, thus providing a means for holding the resin powder particles to the grain surfaces somewhat like a uniform coating, and yet functioning subsequently as a hardening agent for the resin during the curing. Moreover, these esters bring hydrogen chloride into the polymer as above pointed out and do so in a manner to facilitate the freeing of the hydrogen chloride at the grinding line, under the action of the heat which is there produced during grinding.

Furthermore, insofar as I am aware, the esters are new compositions of matter and hence, before setting forth illustrative examples of my methods of employing them for such purposes as those mentioned above, an illustrative or preferred manner of producing them may first be set forth.

I first heat 3 mols of chloracetic acid and 1 mol of the trihydric alcohol (glycerine in the one case, and tri-methylol propane in the other case) at a temperature of from 100° C. to 150° C., in an open flask until the acid number of the mixture is reduced to zero or nearly so. The reaction mixture is then neutralized with sodium carbonate, washed with water and the ester is then dried over sodium sulphate. The ester may then be heated for from 2 to 4 hours at about 100° C., at reduced pressure, say, of 20 millimeters, thus to remove volatile impurities. The esters prepared in this way are liquids and are sufficiently pure for the purposes of my invention.

Having thus set forth an illustrative manner of producing the esters, I may use either of them, or a mixture of them, in various ways of which the following two examples are illustrative of the various aspects of my invention, even though the examples are of the making of grinding wheels.

Example I 500 grams of #46 grit "Alundum" abrasive grain is wet with 25 cc. of glycerol tri-monochloracetate, and thereto is then added 165 grams of a mixture comprising, by volume, 65% of aniline formaldehyde resin, 30% of cryolite, and 5% of soluble anhydrite, under thorough mixing or stirring, thus producing a "dry granular mix." The latter is then spread in a 6" mold and pressed to a pore volume of 20%, and these steps may be performed with the mix cold or at room temperature. The "green" wheel is then stripped from the mold and heat-treated.

Heat treatment may be by way of an oven in which the temperature is raised gradually over a 4-hour period from an initial temperature of about 100° C. to a temperature of 175° C., whence the wheel is kept for about 2 hours at the latter temperature, and then is cooled off.

Example II 1050 grams of #80 grit "Alundum" abrasive grain, 330 grams of a mixture consisting, by volume, of 65% of aniline formaldehyde resin, 30% of cryolite, and 5% of soluble anhydrite, and 55 cc. of tri-methylol propane tri-monochloracetate are thoroughly mixed together and worked on differential mixing rolls until a uniform sheet is obtained whence the sheet is rolled out in a calender roll to give the desired compactness and thickness, a thickness, in the present instance, of $\frac{3}{32}$". From the sheet a 12" disk is cut, thus forming a "green" wheel which is then heat-treated and hence cured, preferably in the manner set forth in Example I.

In each of the above examples, there may be substituted in similar proportions, the other of the two than the one specifically mentioned, or mixtures of the two. The wheels thus made, upon test, are of good efficiency and in general have physical characteristics somewhat like those of a rubber-bonded grinding wheel, making them particularly suitable for use where the rubber-bonded grinding wheel is particularly useful or is preferred or required.

I make no claim herein to the resinous compositions or method of making the same or to the plasticizer or hardening agent inasmuch as such subject matter is disclosed and claimed in my copending application Serial No. 452,095, filed of even date herewith.

According to certain prior practice, difficulties are encountered during heat treatment or curing, due to the fact that swelling occurs, such swelling usually results from the formation of water and is aggravated by the conversion of water or possibly also of other constituents into vapors, under the action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. Method of making a grinding wheel or other abrasive article comprising wetting abrasive grain with a combined grain-wetting and resin-hardening agent that comprises a compound selected from the group consisting of glycerol tri-monochloracetate, tri-methylol propane tri-monochloracetate and a mixture thereof, mixing therewith amine formaldehyde resin to form a mix, shaping the mix and heat-treating it at resin-curing temperature to harden the resin and bond the abrasive grains together.

2. Method of making a grinding wheel or other abrasive article comprising wetting abrasive grain with a combined grain-wetting and resin-hardening agent that comprises a compound selected from the group consisting of glycerol tri-monochloracetate, tri-methylol propane tri-monochloracetate and a mixture thereof, mixing therewith amine formaldehyde resin to form a mix, shaping the mix in a mold to the desired configuration and pressing it to the desired pore volume, removing it from the mold, and then heat-treating it to harden the resin and bond the abrasive grains together.

3. Method of making a grinding wheel or other abrasive article comprising wetting abrasive grain with a combined grain-wetting and resin-hardening agent that comprises a compound selected from the group consisting of glycerol tri-monochloracetate, tri-methylol propane tri-monochloracetate and a mixture thereof, mixing therewith amine formaldehyde resin to form a mix, working the mix into sheet form of the desired thickness, cutting out of the sheet the desired configuration and then curing at resin-curing temperature.

4. Method of making an abrasive wheel or other abrasive article comprising making a mix comprising abrasive grain and aniline formaldehyde resin and a grain-wetting and resin-hardening agent that comprises a compound selected from the group consisting of glycerol tri-monochloracetate, tri-methylol propane tri-monochloracetate and a mixture thereof, and shaping the mix and curing it at resin-curing temperature.

5. Method of making an abrasive wheel or other abrasive article comprising making a mix comprising abrasive grain and aniline formaldehyde resin and a grain-wetting and resin-hardening agent that comprises a compound selected from the group consisting of glycerol tri-monochloracetate, tri-methylol propane tri-monochloracetate and a mixture thereof, working the mix into sheet form to the desired thickness, making out of the sheet form the desired conformation of the abrasive article, and then curing it at resin-curing temperature.

6. Method of making an abrasive wheel or other abrasive article comprising making a mix comprising abrasive grain and aniline formaldehyde resin and a grain-wetting and resin-hardening agent that comprises a compound selected from the group consisting of glycerol tri-monochloracetate, tri-methylol propane tri-monochloracetate and a mixture thereof, cold molding and cold pressing the mix to the desired conformation, and then heat-treating it to cure the resin and bond the abrasive particles together.

7. A grinding wheel or other abrasive article comprising abrasive grains bonded by a bond that comprises reaction product of aniline formaldehyde resin and a compound selected from the group consisting of glycerol tri-monochloracetate, tri-methylol propane tri-monochloracetate and a mixture thereof.

8. A grinding wheel or other abrasive article comprising abrasive grains bonded by a bond that comprises the reaction product of a grain-wetting agent that comprises a compound selected from the group consisting of glycerol tri-monochloracetate, tri-methylol propane tri-monochloracetate and a mixture thereof, which wetting agent wets the abrasive grains and is also a resin-hardener, and amine formaldehyde resin.

9. A grinding wheel or other abrasive body comprising abrasive grains bonded with a resin bond that comprises the reaction product of resin and a plasticizer and hardening agent comprising a compound selected from the group consisting of glycerol tri-monochloracetate, tri-methylol propane tri-monochloracetate and a mixture theereof.

10. The method of making a grinding wheel or other abrasive body comprising making a mix comprising abrasive grain and resin and a grain-wetting and resin-hardening agent comprising a compound selected from the group consisting of glycerol tri-monochloracetate, tri-methylol propane tri-monochloracetate and a mixture thereof, and shaping and curing the mix.

11. The method of making a grinding wheel or other abrasive body comprising making a mix comprising abrasive grain and resin and a grain-wetting and resin-hardening agent comprising a compound selected from the group consisting of glycerol tri-monochloracetate, tri-methylol propane tri-monochloracetate and a mixture thereof, working the mix on mill rolls, then calendering into substantial sheet form to the desired thickness, cutting out of the sheet form the desired configuration of abrasive article, and then curing at resin-curing temperature.

LORING COES, JR.